May 20, 1941.   O. A. LIGHT   2,242,892
STORAGE RACK
Filed Feb. 21, 1941   5 Sheets-Sheet 1

INVENTOR.
OLIVER A. LIGHT.
BY Howard P. King
ATTORNEY

May 20, 1941. O. A. LIGHT 2,242,892
STORAGE RACK
Filed Feb. 21, 1941 5 Sheets-Sheet 2
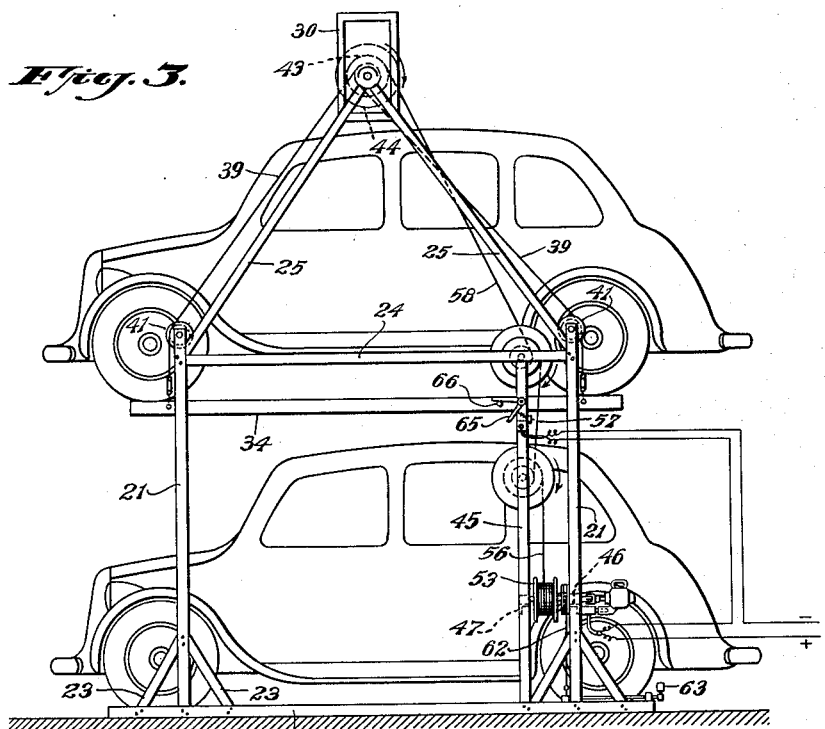
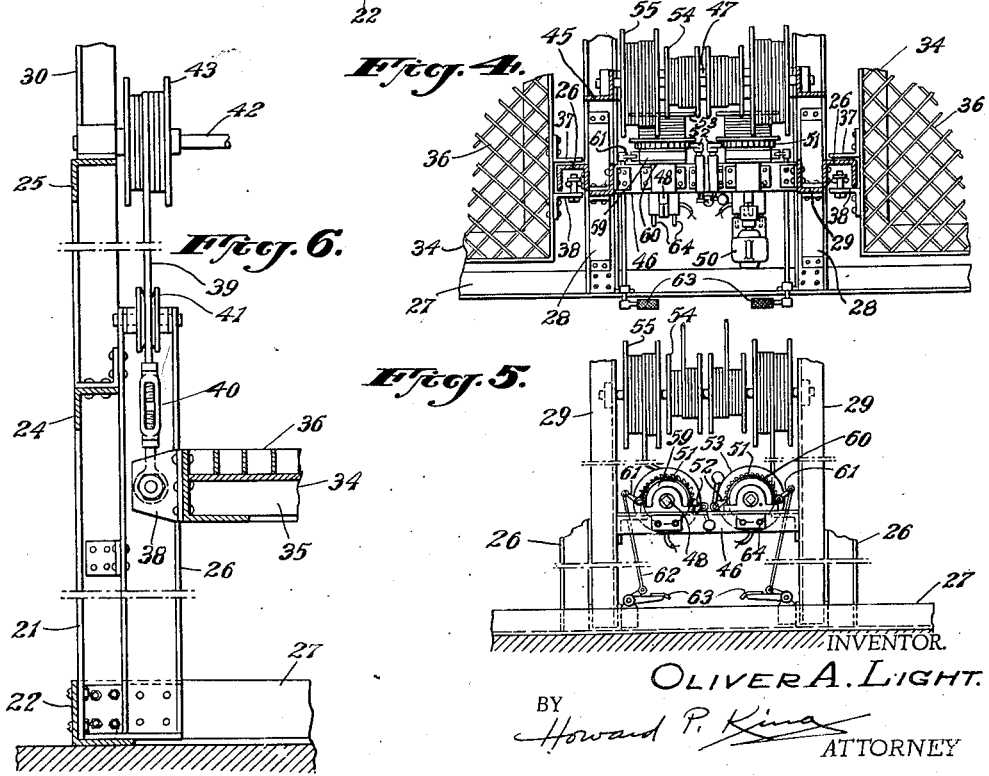
INVENTOR.
OLIVER A. LIGHT.
BY Howard P. King
ATTORNEY May 20, 1941.  O. A. LIGHT  2,242,892
STORAGE RACK
Filed Feb. 21, 1941   5 Sheets-Sheet 3

INVENTOR.
OLIVER A. LIGHT.
BY Howard P. King
ATTORNEY

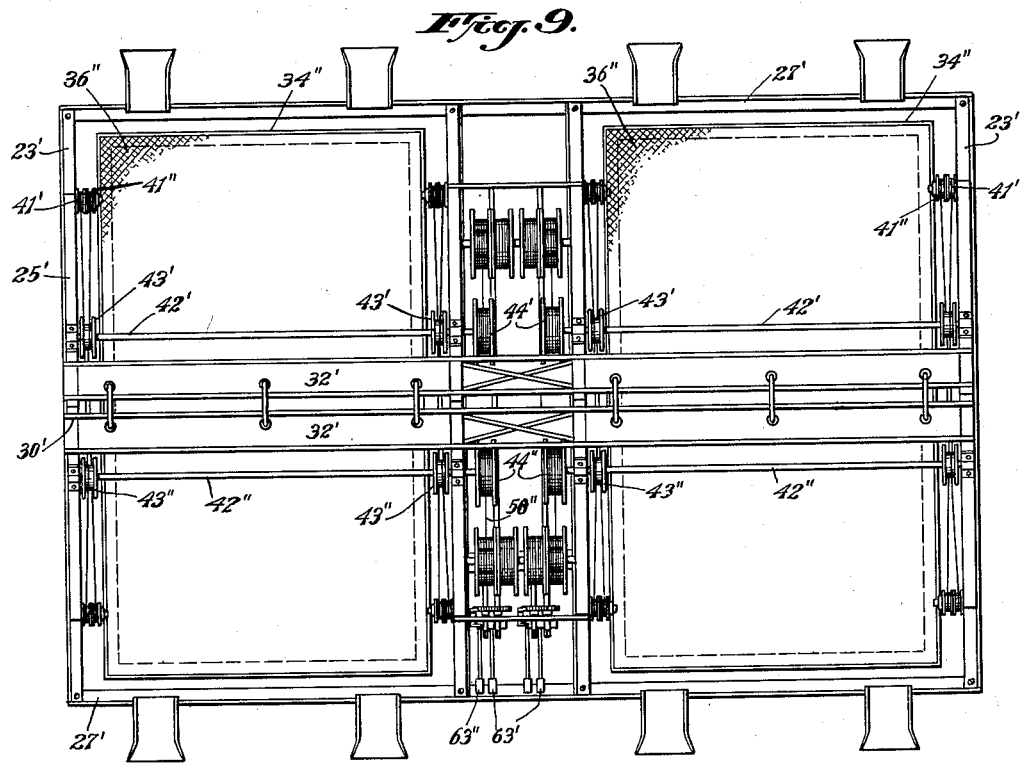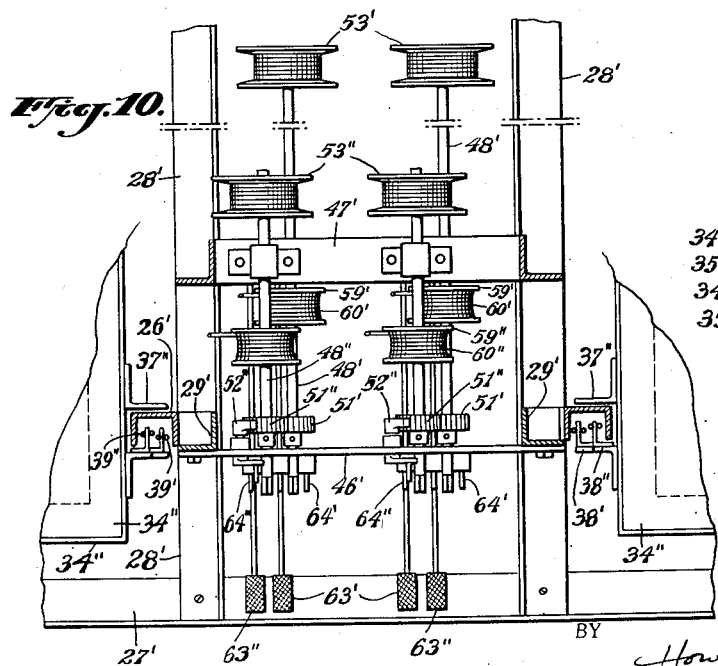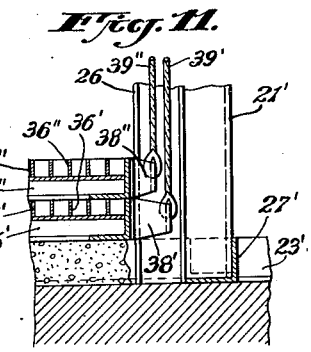

May 20, 1941.  O. A. LIGHT  2,242,892
STORAGE RACK
Filed Feb. 21, 1941  5 Sheets-Sheet 5

INVENTOR.
OLIVER A. LIGHT.
BY Howard P. King
ATTORNEY

Patented May 20, 1941

2,242,892

UNITED STATES PATENT OFFICE 2,242,892

STORAGE RACK

Oliver A. Light, East Orange, N. J.

Application February 21, 1941, Serial No. 379,968

11 Claims. (Cl. 254—144)

This invention relates to storage racks, and particularly to storage racks for vehicles, and having utility in garages, parking lots and elsewhere for increasing the effective storage capacity of any given area. The subject matter of the present invention is in part a continuation of and in part an improvement upon my prior allowed application S. N. 327,683.

The objects of the invention are to provide an improved, effective storage rack of the character stated; to provide a storage rack which is self-maintaining and adaptable to being readily set up at a selected place; to provide for adequate bracing for adapting the structure to use in open areas with minimum necessity for foundation or other preparatory construction; to brace the rack in pairs and enable a series of such pairs to be closely associated for mutual support; to conserve space and material and increase storage capacity for a given area to a desired maximum; to adjust and maintain the platforms in level position and guided against lateral displacements; to simplify the elevating and lowering mechanisms; to enable the elevating operation to be accomplished by an electric motor; to utilize a portable motor for any platform chosen to be elevated; to cause the motor to function by applying it in place with respect to any chosen platform; to automatically stop the motor when the platform reaches its uppermost position; to avoid an extension electric wire attached to the motor; to necessitate release of only a single pawl in order to release the platform to lower the same; to associate the retarding brake and said pawl in such relation that the operator will naturally use the right brake with release of a given pawl; to secure simplicity of construction and operation; and to obtain other advantages and results as may be brought out in the following description.

Referring to the accompanying drawings in which like numerals of reference indicate similar parts throughout the several views:

Figure 3 is a side elevation of the rack of Figs. 1 and 2, showing the portable motor in operative position and diagrammatically indicating the wiring therefor;

Figure 4 is a fragmentary sectional plan above the motor and first set of power-increasing drums;

Figure 5 is a front elevation of the fragmentary portion shown in Fig. 4;

Figure 6 is a vertical section adjacent one of the vertical rails;

Figure 9 is a plan of the rack of Fig. 7;

Figure 10 is a sectional plan on line 10—10 of Fig. 7;

Figure 11 is a fragmentary sectional elevation next a vertical rail and with the platforms in lowered position;

Figure 1:
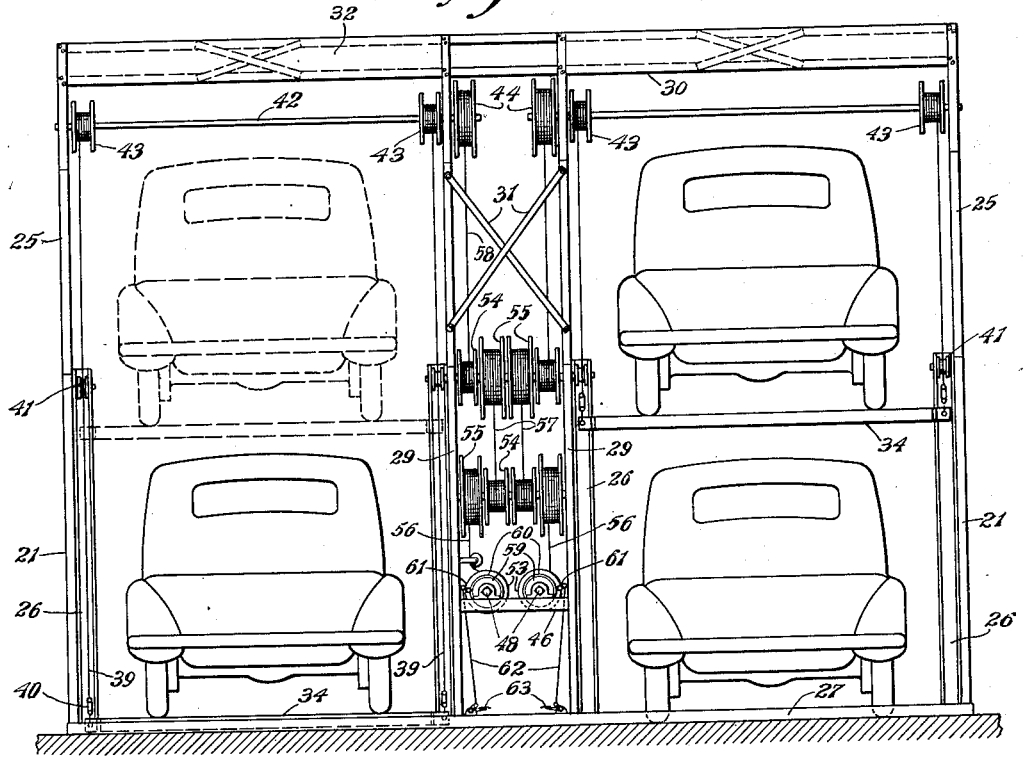
Figure 1 is an end elevation of a rack unit consisting of two storage sections or tiers, constructed in accordance with my invention, each tier having storage capacity for two vehicles.
Figure 2:
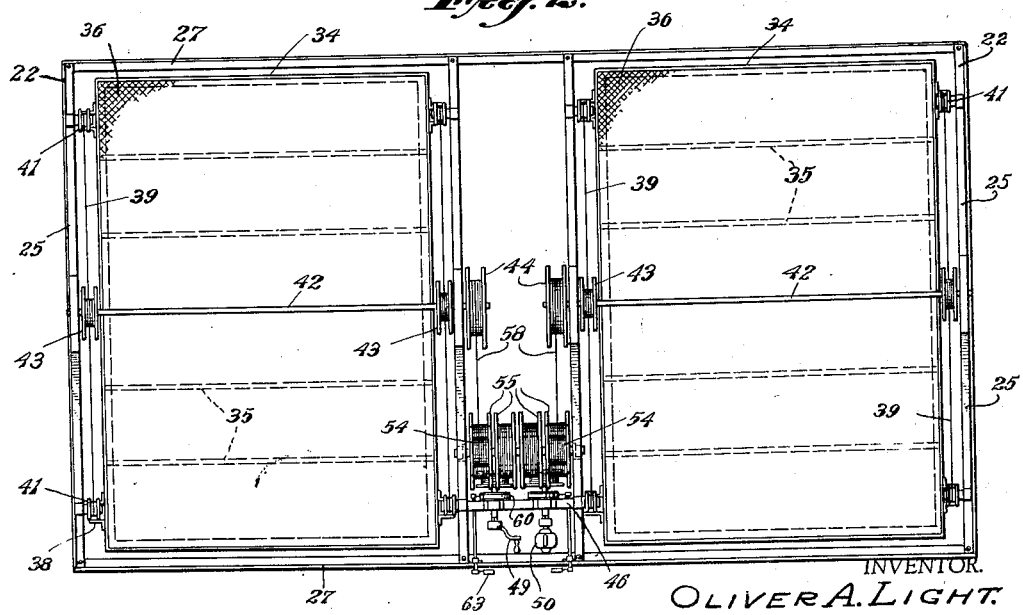
Figure 2 is a plan of the same with the top brace omitted to avoid obscuring parts situated directly beneath.

In the specific embodiment of the invention illustrated in said drawings and giving attention initially to Figures 1 to 6, inclusive, a storage rack is shown comprising in general a frame constructed for support of two tiers of platforms or storage spaces. The frame is preferably fabricated in sections which are, in general terms, end sections, intermediate sections, sills and ridgepole.

Each end section comprises front and rear upright corner posts 21 preferably permanently secured to a horizontal bottom side sill 22 at their lower ends, said bottom side sill projecting at each end past the post next thereto. Braces 23 from the bottom side sill diagonally upward in both directions to each post keep the post rigid in upright perpendicular relation to the sill. Near the top of the posts, spanning from one to the other and secured thereto, is an upper side sill 24 horizontally disposed and parallel to the bottom side sill aforementioned. From each post next the juncture of said upper sill therewith, projects an upwardly sloping member or rafter 25, one being secured to the front post and sloping upwardly rearward whereas the other is secured to the rear post and slopes upwardly forward. These rafters meet over the middle of the section and are there secured together. Thus the said frame is rigid, of few parts and adapted to be made of channel and angle iron of moderate weight, so each frame section can be transported, handled and set up in place as an entity. It may be stated at this point, that the said posts also include guideways for the elevator platform subsequently described, and for that purpose said posts have at their inner sides vertical tracks 26 of channel iron and arranged with the channel of the front post facing forwardly and the channel of the rear post facing rearwardly. The foregoing description of one end section applies as well to the other end section, as each end section is a duplicate of the other.

The two end sections are preferably connected at front and back by front and back bottom sills 27 situated horizontally and perpendicular to the aforementioned bottom end sills 24. All of said sills are preferably secured releasably, as by bolts, one to the other, for enabling the structure to be "knocked down" or disassembled for removal to another place when necessary.

Between the two end sections and parallel thereto are two intermediate sections closely similar to and of the same general proportions as the end sections. They accordingly each include a bottom sill 28 releasably secured at its ends, as by bolts, to an intermediate or midportion of the front and back bottom sills 27. Inward from the ends of the intermediate section bottom sill 28 are secured uprights or front and back intermediate posts 29 parallel to each other and to the previously described corner posts, and similarly braced and of equal height as the corner posts. Each intermediate section also has a vertical channel-iron track, an upper sill and sloping rafters identical with those of the end sections and identified by the same reference numerals. A ridgepole 30 common to the several frames is secured to all the rafters at their upper ends, in a manner enabling the ridgepole to be disassembled from the sections.

The intermediate sections are spaced sufficiently far apart to accommodate platform operating mechanisms, and to also constitute a rigid spine for the frame. To this end, the intermediate sections are not only secured to the sills and ridgepole, but have suitable and adequate diagonal cross braces 31 between the sections. The entire frame will consequently be prevented from side sway or collapse.

Supplemental bracing is of course accomplished by the common ridgepole extending from side to side of the frame and to which all sections are bolted or otherwise releasably secured. The ridgepole is preferably constructed in the nature of a braced girder and with vertical front and rear surfaces 32 for display or advertising purposes.

The description of the frame so far given with respect to Figures 1 to 6 also applies to the modified structure shown in Figures 7 to 13 except that the posts and tracks are higher in the modified construction and an intermediate sill 33 is provided. The parts above described are accordingly identified in Figures 7 to 13 with the same reference numerals but distinguished by a prime exponent. The intermediate sill here mentioned, identified by numeral 33 is parallel to and midway between bottom sills 22' and upper side sills 24' of the side frames and corresponding bottom sills 28' and upper sills 24'' of the intermediate section.

The elevator construction will be first described with respect to the showing of Figures 1 to 6. As there shown, a horizontal platform 34 is shown of appropriate size to receive a motor vehicle thereon. Said platform is situated within the space defined by one side and intermediate bottom sills and by corresponding portions of the front and rear bottom sills. As two such spaces are defined by the complete frame, there are two platforms 34, one in each space. Preferably each platform is a rectangular frame fabricated of inwardly facing angle-irons around the perimeter thereof with a plurality of parallel cross supports 35 supported at their opposite ends on the inwardly directed bottom flanges of the side angle irons of the platform frame. Upon these cross supports 35 and end frame members rests a suitable floor 36 for the platform, which may conveniently be of open-work or grill construction. On the sides of the platform frame may be secured appropriate guides and cable mounts in proximity to each vertical track. The specific showing of these parts here depicted comprises an angle bracket 37 adjacent the closed side of the channel track and a similar angle bracket 38 opposed to the first and at the open side of the channel track. This last mentioned angle bracket 38 is the mounting means for a supporting cable 39. As best shown in Figure 6, the supporting cable may include a turnbuckle 40 as part thereof. As there is a lifting cable at each corner of the platform, the strain on each may be equalized and the platform mounted in horizontal position by adjustment of the turnbuckles.

At the top of each post is mounted an idler pulley 41 over which the respective cables pass for continuing in the general direction of the adjacent sloping rafter upwardly toward the ridgepole. Above and transverse to each platform in proximity to the ridgepole and parallel thereto is a driven lifting shaft 42. Each shaft has secured thereto near its ends two drums 43, 43 adjacent the respective outer frame section and intermediate frame section next the platform under discussion. As shown in Fig. 3 the cables from the end of the platform next the front of the frame pass to the underside of these drums whereas the cables next the back of the frame pass to the upper side of these drums. All the cables will accordingly be wound up simultaneously or unwound simultaneously as the shaft rotates. Weight of the platform can be relied upon to obtain the unwinding of the cables and lowering of the platform.

On each said shaft 42 next the intermediate section, is a lifting drum 44 fast on the shaft, so as to rotate said shaft when the said drum is rotated. Both of these lifting drums are in the space left between the intermediate sections, and each is operable independent of the other. The operating mechanism will accordingly be described with respect to one, for convenience, but is applicable to either. The intermediate section preferably has a supplemental upright 45 parallel to and somewhat behind the front upright or post 29 of that section. The top and bottom ends of this supplemental upright are fixed to the appropriate sills of the section so as to be rigid with respect to the section framework. Cross-cleats 46 and 47 are provided between the front posts of the intermediate sections and between these supplemental uprights 45, at an elevation approximately waist-high to an operator.

For each elevator unit is provided a power shaft 48 extending in a forward direction and journaled on said cleats. The forward end of said shaft projects in front of front cleat 46 and is squared or otherwise formed to receive a power device, such as a crank 49 or motor 50 removably applied thereto as needed. Likewise on said power shaft, shown situated behind the front cleat, is a ratchet wheel 51 engaged by a pawl 52. Next the rear cleat and fixed on the shaft is a power drum 53. By use of successive coaxial inter-connected small and large drums 54, 55, one of which winds while the other unwinds, suitable power increase at the expense of speed through successive cables 56, 57 and 58 may be obtained from power drum 53 on power shaft 48 to the lifting drum 44 on driven lifting shaft 42 at the top of the frame.

While, of course, it is possible to use the crank 49 for operating the mechanism to lift the elevator platform and vehicle, the primary function of the crank is for releasing the tension of the ratchet wheel against the pawl so the operator may then swing the pawl out of engaging position and permit the platform to lower to the ground. Suitable retarding means are provided for enabling the platform and vehicle to be lowered slowly and without risk of getting out of control of the operator. For this purpose, I show a brake drum 59 fast upon the power shaft 48. A contracting brake-band 60 encircles the brake drum, said brake-band having any usual mounting and contracting levers in turn operated by a projecting lever 61 which has link connection 62 to a treadle 63 situated next the ground below and to the front of the power shaft to be controlled. This situation of the brake treadle assures use by the operator of the right treadle for the shaft having the ratchet which is released by the operator.

Preferably each elevator is wired electrically so the lifting motor 50 may be used without any extension wire attached thereto. As shown, the motor provides a casing containing the usual armature the end of which is constructed to be slid onto the squared or angular end of the power shaft. The casing is socketed or otherwise constructed to simultaneously plug into or onto electrical contacts 64 fixed with respect to the frame, so that merely applying the motor in place causes it to function. Furthermore torque is counteracted in anchoring the motor casing by its plugging into the electric contacts. An automatic stopping switch 65 is provided to break the electric circuit to the motor when the platform reaches its elevated position, as illustrated in Fig. 3. Any suitable protuberance 66 on the platform can be arranged to engage and swing the switch to open position.

Figure 7:
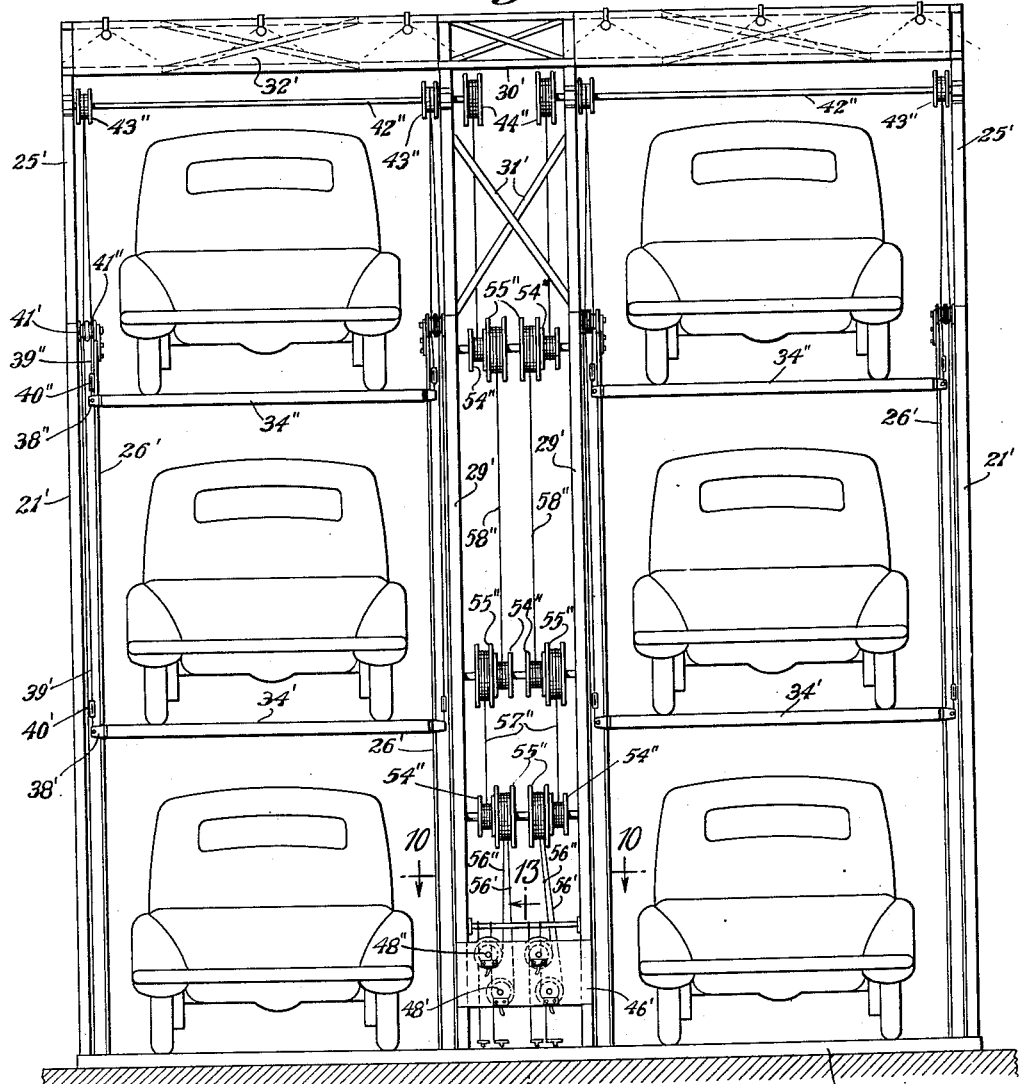
Figure 7 is a front elevation of a rack unit consisting of two tiers and each tier having storage capacity for three vehicles.
Figure 8:
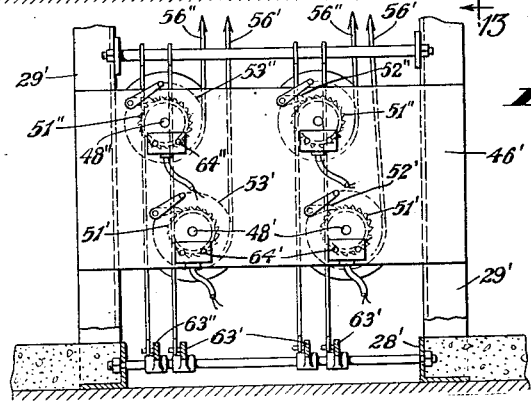
Figure 8 is a sectional elevation of the brakes, ratchets and associated parts on a scale somewhat greater than the showing thereof in Fig. 7.
Figure 12:
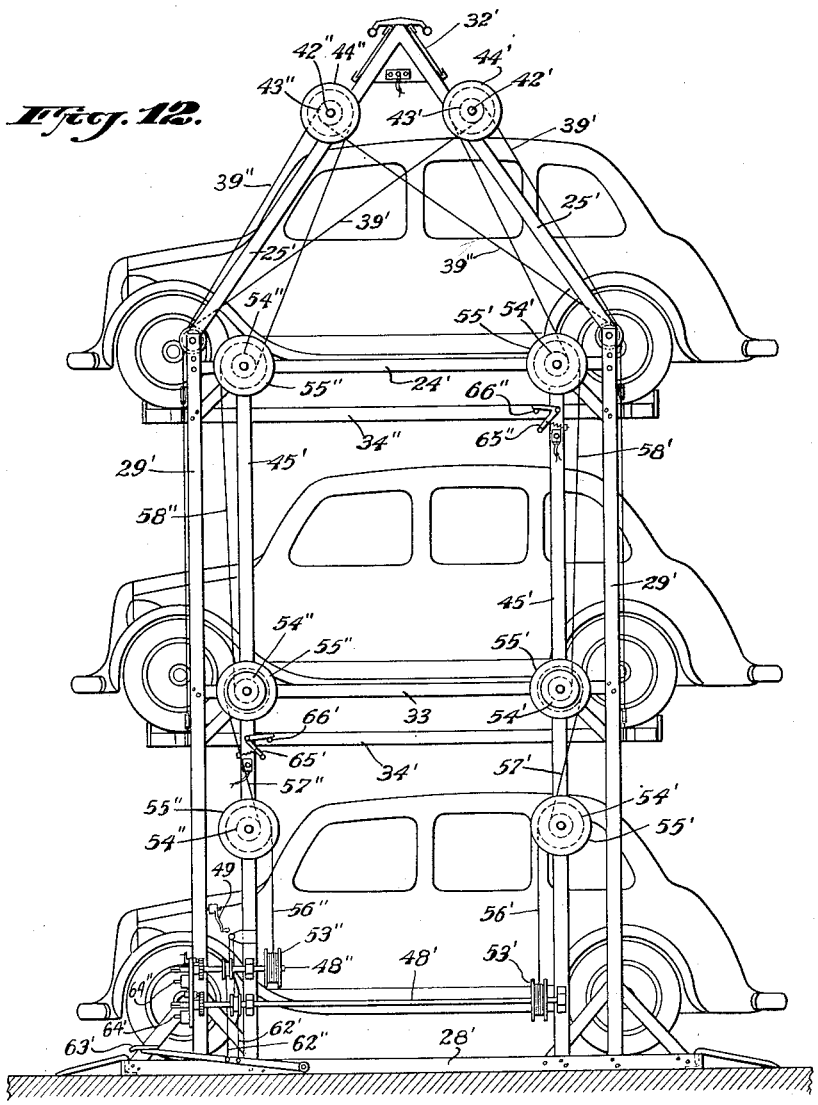
Figure 12 is an elevation of one of the tiers of racks looking at the side between tiers.
Figure 13:
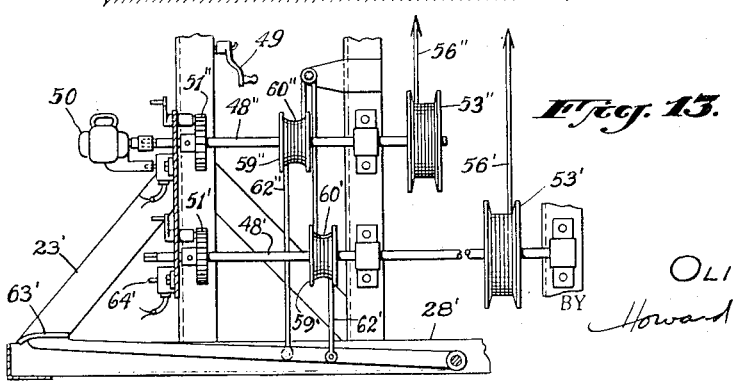
Figure 13 is a fragmentary sectional elevation similar to the lower left corner portion of but on increased scale over Fig. 12.

The operating mechanism of the double-platform structure of Figures 7 et sequel, is substantially the same as that above-described except that an additional power shaft, driven shaft and associated parts are shown for the additional platform. The numerals used in the above-description are accordingly applied in these views, using prime marks for the parts related to the lower platform 34' and double prime marks for the parts related to the upper platform 34". It will be understood in this construction that the upper platform lowers to rest upon the lower platform which in turn rests on the ground, and the first car to be stored is driven onto the lowered upper platform, which is then raised, after which a car can be driven onto the lower platform which is thereafter elevated, and lastly a third vehicle is driven into the space beneath the elevated platforms. The construction is therefore illustrative of the adaptation of my invention to multiple elevator platforms as well as multiple storage spaces. The rack structure provides for two vertical tiers of stored cars in each instance with operating mechanisms between those tiers. Additional racks of similar structure can be placed contiguous to the one illustrated without any loss of space between the racks, and a series of such racks will be mutually bracing one to the others. It is to be particularly noted that the racks may be dis-assembled very readily, and in doing so, for moving from one lot to another, the intermediate sections of each rack may be left assembled one with respect to the other and moved as a unit, thereby saving considerable labor both in dismantling and in re-assembling.

I claim:

1. A storage rack providing two vertical tiers of storage spaces for vehicles, said rack having intermediate frame sections spaced apart and braced with respect to each other, an elevator platform in each tier space, means for elevating said platforms, and operating mechanism for each elevator platform, said mechanism being situated in the space between the intermediate frame sections and accessible for operator manipulation each at the same side of the rack.

2. A storage rack providing two vertical tiers of storage spaces for vehicles, said rack having intermediate frame sections spaced apart and braced with respect to each other, an elevator platform in each tier space, means for elevating each platform, operating mechanism for applying lifting force to said elevating means for each platform, and power shafts for each platform, said shafts being situated between and projecting forwardly with respect to said intermediate frame sections and having driving connection to said operating mechanism.

3. A storage rack providing two vertical tiers of storage spaces for vehicles, said rack having intermediate frame sections spaced apart and braced with respect to each other, an elevator platform in each tier space, means for elevating each platform, operating mechanism for applying lifting force to said elevating means, power shafts having driving connection to said operating mechanism for each platform, an electric motor releasably applicable to said shaft, and means for retaining said shaft against backward rotation.

4. A storage rack providing two vertical tiers of storage spaces for vehicles, said rack having intermediate frame sections spaced apart and braced with respect to each other, an elevator platform in each tier space, means for elevating each platform, operating mechanism for applying lifting force to said elevating means, power shafts having driving connection to said operating mechanism for each platform, an electric motor releasably applicable to said shaft, and a pawl and ratchet for retaining said shaft against backward rotation.

5. A storage rack providing two vertical tiers of storage spaces for vehicles, said rack having intermediate frame sections spaced apart and braced with respect to each other, an elevator platform in each tier space, means for elevating each platform, operating mechanism for applying lifting force to said elevating means, power shafts having driving connection to said operating mechanism for each platform, an electric motor releasably applicable to said shaft, and a brake for retaining said shaft against backward rotation.

6. A storage rack providing two vertical tiers of storage spaces for vehicles, said rack having intermediate frame sections spaced apart and braced with respect to each other, an elevator platform in each tier space, means for elevating each platform, operating mechanism for applying lifting force to said elevating means, power shafts having driving connection to said operating mechanism for each platform, an electric motor releasably applicable to said shaft, a pawl and ratchet for retaining said shaft against backward rotation, and a brake for holding and retarding backward rotation of the shaft upon release of the pawl.

7. A storage rack providing a frame open at the front for ingress and egress of a vehicle to a position within the frame, a platform within the frame to receive said vehicle, lifting cables at each corner of the platform, a shaft above and crosswise of the platform at a height from the lowermost position of the platform more than twice the height of the vehicle, said shaft having drums for winding all said cables simultaneously, a lifting drum on said shaft for operating said shaft, a power shaft extending forwardly at the side to the frame with its forward end accessible to an operator for rotating said shaft, said power shaft having a drum thereon spaced rearwardly of the forward end of said shaft, a plurality of power-increasing drums and cables to said lifting drum from said power shaft drum, and means applicable to the forward end of and for driving said power shaft.

8. A storage rack providing a frame open at the front for ingress and egress of a vehicle to a position within the frame, a platform within the frame to receive said vehicle, lifting cables at each corner of the platform, a shaft and drums for winding all said cables simultaneously, a lifting drum on said shaft for operating said shaft, a power shaft extending forwardly at the side to the frame with its forward end accessible to an operator for rotating said shaft, said power shaft having a drum thereon spaced rearwardly of the forward end of said shaft, a plurality of power-increasing drums and cables to said lifting drum from said power shaft drum, and means applicable to the forward end of and for driving said power shaft, said means comprising a portable motor applicable to the end of said power shaft.

9. A storage rack providing a frame open at the front for ingress and egress of a vehicle to a position within the frame, a platform within the frame to receive said vehicle, lifting cables at each corner of the platform, a shaft and drums for winding all said cables simultaneously, a lifting drum on said shaft for operating said shaft, a power shaft extending forwardly at the side to the frame with its forward end accessible to an operator for rotating said shaft, said power shaft having a drum thereon spaced rearwardly of the forward end of said shaft, a plurality of power-increasing drums and cables to said lifting drum from said power shaft drum, means for driving said power shaft, said means comprising a portable motor applicable to the end of said power shaft, said motor having a casing and a rotatable armature, and means on the rack for preventing the motor casing from rotating while the armature rotates and rotates the shaft.

10. A storage rack providing a frame open at the front for ingress and egress of a vehicle to a position within the frame, a platform within the frame to receive said vehicle, lifting cables at each corner of the platform, a shaft and drums for winding all said cables simultaneously, a lifting drum on said shaft for operating said shaft, a power shaft and drum, a plurality of power-increasing drums and cables to said lifting drum from said power shaft drum, and means for driving said power shaft, said means comprising a portable motor applicable to the end of said power shaft, said motor having a casing and a rotatable armature, and means for plugging in the motor electrically simultaneously with applying it to the end of the power shaft.

11. A storage rack providing a frame open at the front for ingress and egress of a vehicle to a position within the frame, a platform within the frame to receive said vehicle, lifting cables at each corner of the platform, a shaft and drums for winding all said cables simultaneously, a lifting drum on said shaft for operating said shaft, a power shaft and drum, a plurality of power-increasing drums and cables, to said lifting drum from said power shaft drum, means for driving said power shaft, said means comprising a portable motor applicable to the end of said power shaft, and means automatically shutting off electric power to the motor by elevation of the platform to its raised position.

OLIVER A. LIGHT.